(12) United States Patent
Yang et al.

(10) Patent No.: US 9,434,621 B2
(45) Date of Patent: Sep. 6, 2016

(54) MESOPOROUS COMPOSITE TITANIUM OXIDE AND A PREPARATION METHOD

(75) Inventors: Zhuhong Yang, Jiangsu (CN); Yudan Zhu, Jiangsu (CN); Xiaohua Lu, Jiangsu (CN); Changsong Wang, Jiangsu (CN); Licheng Li, Jiangsu (CN); Linghong Lv, Jiangsu (CN); Wei Zhuang, Jiangsu (CN); Chang Liu, Jiangsu (CN); Xin Feng, Jiangsu (CN)

(73) Assignees: NANJING UNIVERSITY OF TECHNOLOGY, Nanjing Jiangsu (CN); NANJING TAIWEI TECHNOLOGY CO., LTD., Nanjing, Jiangsu (CN)

( * ) Notice: Subject to any disclaimer, the term of this patent is extended or adjusted under 35 U.S.C. 154(b) by 1200 days.

(21) Appl. No.: 13/393,014

(22) PCT Filed: Aug. 28, 2009

(86) PCT No.: PCT/CN2009/073599
§ 371 (c)(1),
(2), (4) Date: Apr. 2, 2012

(87) PCT Pub. No.: WO2011/022888
PCT Pub. Date: Mar. 3, 2011

(65) Prior Publication Data
US 2012/0184433 A1 Jul. 19, 2012

(51) Int. Cl.
| | | |
|---|---|---|
| *B01J 21/06* | (2006.01) | |
| *B01J 21/18* | (2006.01) | |
| *B01J 27/02* | (2006.01) | |
| *B01J 27/057* | (2006.01) | |
| *B01J 27/14* | (2006.01) | |
| *B01J 37/08* | (2006.01) | |
| *B01J 37/10* | (2006.01) | |
| *H01B 1/04* | (2006.01) | |
| *H01B 1/08* | (2006.01) | |
| *C01G 23/047* | (2006.01) | |
| *B01J 29/03* | (2006.01) | |
| *B01J 35/10* | (2006.01) | |
| *C04B 38/00* | (2006.01) | |
| *H01M 4/131* | (2010.01) | |
| *H01M 4/36* | (2006.01) | |
| *H01M 4/485* | (2010.01) | |
| *H01M 10/052* | (2010.01) | |
| *H01M 4/02* | (2006.01) | |

(52) U.S. Cl.
CPC ............ *C01G 23/047* (2013.01); *B01J 21/063* (2013.01); *B01J 29/0308* (2013.01); *B01J 35/1014* (2013.01); *B01J 35/1019* (2013.01); *B01J 35/1038* (2013.01); *B01J 35/1061* (2013.01); *C04B 38/009* (2013.01); *H01M 4/131* (2013.01); *H01M 4/364* (2013.01); *H01M 4/366* (2013.01); *H01M 4/485* (2013.01); *H01M 10/052* (2013.01); *C01P 2006/12* (2013.01); *C01P 2006/14* (2013.01); *C01P 2006/16* (2013.01); *H01M 2004/021* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 2004/0020825 A1* | 2/2004 | Benazzi | C10G 65/04 208/89 |
| 2004/0238410 A1* | 12/2004 | Inoue | B01J 21/06 208/213 |
| 2005/0150819 A1* | 7/2005 | Wachs | C07C 7/14816 208/208 R |

FOREIGN PATENT DOCUMENTS

WO PCT/CN2009/073599 6/2010

* cited by examiner

*Primary Examiner* — Colin W Slifka
(74) *Attorney, Agent, or Firm* — Global IP Services; Tianhua Gu

(57) ABSTRACT

A mesoporous composite titanium oxide, which is composed of a mesoporous titanium oxide, the outside surface and the wall of pores of the mesoporous titanium oxide are modified by inorganic matters; inorganic matter contains at least one element selected from carbon, silicon, sulphur, phosphorus and selenium in an amount of 0.01%-25%, on amount of the element mass, of the mass of said mesoporous composite titanium oxide material; at least one mean pore size of pore distribution of the mesoporous compound titanium oxide material is 3-15 nm, the specific surface area is 50-250 $m^2/g$, and the pore volume is 0.05-0.4 $cm^3/g$. As a catalyst carrier, the rate of conversion of the hydrodesulfurization reaction of the material reaches as high as 98 percent, and as a lithium ion battery cathode material, the specific capacity of the lithium ion battery cathode material reaches as high as 220 mAh/g.

9 Claims, No Drawings

US 9,434,621 B2

MESOPOROUS COMPOSITE TITANIUM OXIDE AND A PREPARATION METHOD

FIELD OF THE INVENTION

The invention belongs to the technical field of material preparation, particularly relates to a mesoporous composite titanium oxide and a preparation method thereof. The base material is mesoporous titanium oxide.

BACKGROUND OF THE INVENTION

Titanium oxide belongs to photosensitive semiconductor materials and has been applied widely in fields of the photocatalytic hydrogen generation, organic matter degradation and solar energy batteries. In recent years, the application potential of titanium oxide in other fields is increasingly discovered, and as a catalyst carrier and a lithium ion battery cathode material, titanium oxide attracts more and more attention in the fields of applications to energy, environment, etc. For example, in the field of catalyst, the preparation of catalytic materials having double functions of being carrier and catalyst can greatly reduces cost, and thus has an attractive prospect of industry. Compared with the conventional catalyst inert carrier, such as γ-Al$_2$O$_3$, titanium oxide has favorable catalytic activity and it is a catalyst carrier material with great potential [1]; in the field of lithium ion batteries, the unique crystal structure of titanium oxide facilitates insertion/extraction of lithium ions, and compared with the conventional carbon material cathode material, titanium oxide as a new generation of cathode material has low cost, safe use, and low possibility of causing explosion [2]. Meanwhile, with the growth of nanotechnology, titanium oxide with nanotopography or pores is increasingly developed, which promotes the application of titanium oxide in these fields.

As a catalyst carrier or a lithium ion battery cathode material higher specific surface area of titanium oxide is required. For instance, nano TiO$_2$ as a catalyst carrier has high catalytic activity, but the excessive small size of granules causes difficult recovery and utilization, the easy agglomeration, and great reduction of the specific surface area after calcination molding result in significant decrease of the catalytic activity. The specific surface area of TiO$_2$ prepared by anatase type TiO$_2$ particle molding or lamellar titanate ion exchange is lower than 30 m$^2$/g, porous titanium oxide with high specific surface area is generally obtained by sol-gel method, but industrial production by sol-gel method is impossibly realized because of complex process, expensive raw material and possible environmental risks.

In light of above problems, the studying team successfully takes potassium titanate as raw material to prepare mesoporous titanium oxide [3] (ZI0316827.5) with high specific surface area through a strengthened solid phase microstructure conversion process. The specific surface area of the prepared mesoporous titanium oxide is higher than 50 m$^2$/g. The mesoporous titanium oxide has highly crystallized mesopores, needs no template agent in synthesis, has simple process and low cost, and thus is suitable for bulk production. On this basis, the pore structure of the mesoporous titanium oxide can be adjusted as required according to the method disclosed in the patent [4] (PCT/CN2007/070428).

However, as a catalyst carrier and a lithium ion battery cathode, mesoporous titanium oxide material has some disadvantages that: (1), as a carrier, titanium oxide easily reacts with metal precursors during preparing catalyst because of strong hydrophilicity, and thus is unfavorable to dispersion of metal active components; and (2), as a lithium ion battery cathode, the larger specific surface area causes side reaction occurring on the contact surface between an electrode and electrolyte.

Currently modification based on titanium oxide is mainly organic matter modification based on titanium oxide nano particles, in which the soluble dispersion capacity of titanium oxide is changed through interface behavior of organic matter [5]. On the one hand, mesoporous titanium oxide, as described above, is superior to nano titanium oxide in application; and on the other hand, inorganic matter modification with direct use of organic matter is not benefit to practical application of industrialization because molecules of organic matter is easily decomposed at high temperature and in acid or alkaline conditions.

The inventor has discovered in research that mesoporous titanium oxide can satisfy the requirements of being a catalyst carrier and a lithium ion battery cathode better if using inorganic matters which are inert to acid and alkali and high temperature, such C, Si, S, P and Se, to improve the property of pores of mesoporous titanium oxide.

SUMMARY OF THE INVENTION

The object of the invention is to provide a mesoporous composite titanium oxide material. As a catalyst carrier, the rate of conversion of the hydrodesulfurization reaction of the material reaches as high as 98 percent, and as a lithium ion battery cathode material, the specific capacity of the lithium ion battery cathode reaches as high as 220 mAh/g.

The other objective of the invention is to provide a preparation method of the mesoporous composite titanium oxide. The method has the advantages of simple process, low cost, suitability for bulk industrial production, etc.

The objectives of the invention can be achieved by the following solutions:

A novel mesoporous composite titanium oxide material is obtained from a mesoporous titanium oxide is modified by an inorganic matter on the outside surface and the wall of pores of the mesoporous titanium oxide; said inorganic matter contains at least one element selected from carbon, silicon, sulphur, phosphorus and selenium, the element contained by the inorganic matter is in an amount of 0.01%-25% a mass of said mesoporous composite titanium oxide material; at least one mean pore size of pore distribution of the mesoporous compound titanium oxide material is 3-15 nm, a specific surface area is 50-250 m$^2$/g, and a pore volume is 0.05-0.4 cm$^3$/g. The morphology of the mesoporous composite titanium oxide presents crystal whiskers, fiber or particles with the diameter of 0.1-10 μm or equivalent diameter.

Through X-ray diffraction or Raman spectra test, the crystal form of titanium oxide in the mesoporous titanium oxide composite of the invention is one or more than one element of anatase phase titanium oxide, TiO$_2$(B) phase titanium oxide and rutile phase titanium oxide.

A preparation method of the mesoporous composite titanium oxide comprises the following steps of: dissolving a precursor containing at least one element selected from Si, C, S, P and Se in water or organic solvent to form solution, adding mesoporous titanium oxide into the solution and stirring for 1-72 hours (preferably 1-24 hours), then filtering and washing with water or organic solvent, and carrying out sintering in a specific atmosphere at 300-900° C., preferably 300-500° C.

The mean pore size of the raw material of mesoporous titanium oxide is 3-15 nm, the pore volume is 0.05-04 cm$^3$/g, the specific surface area is 50-250 m$^2$/g, and the crystal form of the titanium oxide is at least one of anatase phase titanium oxide, TiO$_2$(B) phase titanium oxide and rutile phase titanium oxide. The morphology of the mesoporous titanium oxide presents crystal whiskers, fiber or particles with the diameter of 0.1-10 μm or equivalent diameter.

In the preparation method of the invention, the organic solvent used for dissolution is non-polar or weak-polar solvent or strong-polar solvent, which just can dissolve precursor molecules, preferably at least one selected from toluene, mesitylene, ethanol, methanol, ether, acetone, dichloromethane, chloroform, carbon tetrachloride and carbon disulfide with different proportioning, used for dissolving the precursor molecules during the preparation process.

In the preparation method of the invention, the organic solvent used for washing is non-polar or weak-polar solvent or strong-polar solvent, preferably one elected from toluene, mesitylene, ethanol, methanol, ether, acetone, dichloromethane, chloroform, carbon tetrachloride and carbon disulfide. During the preparation process, precursor molecules can be bound to the outside surface and the pore wall of the mesoporous titanium oxide by means of chemical bonds, and in this case the objective of washing with the organic solution is to wash off precursor molecules not be bound to the mesoporous titanium oxide; precursor molecules can also be adsorbed on the outer surface or the pore wall, and in this case the objective of washing with the organic solution is to wash off redundant precursor molecules on the outside surface.

The precursor used in the preparation method of the invention is acid, alkali, soluble inorganic salt or organic matter containing at least one element selected from C, Si, S, P and Se, preferably $C_4$-$C_{20}$ carbohydrate, $C_4$-$C_{20}$ alcohol, $C_4$-$C_{20}$ mercaptan, $C_4$-$C_{20}$ silane, and $C_4$-$C_{20}$ organic phosphonic acid or selenate, more preferably 1-naphthol, glucose, furfuryl alcohol, thiophenol, trichlorooctadecylsilane, phenylphosphonic acid or sodium selenite. The concentration of the precursor in water or organic solvent is 0.001-10 mol/L, preferably 0.001-1 mol/L; the molar ratio of the precursor to the mesoporous titanium oxide is 0.001-1, preferably 0.001-0.5, more preferably 0.001-0.2, and the most preferably 0.001-0.03.

In the preparation method of the invention, the atmosphere used in the sintering process is at least one gas with different proportioning selected from $N_2$, $O_2$, Ar, $H_2O$, He, $H_2$, CO and $CO_2$; the heat preservation time is 3-20 hours; and the sintering temperature is 300-900° C.

The raw material of mesoporous titanium oxide used in the preparation method of the invention is prepared according to the method provided by the patents (ZL0315827.5) and (PCT/CN2007/070428), specifically as follows: taking titanium compound and potassium compound as raw material, converting the titanium compound and potassium compound into TiO$_2$ and K$_2$O, mixing the TiO$_2$ and K$_2$O evenly according to the ratio of TiO$_2$/K$_2$O=1-4 mol, and sintering the mixture for over 30 hours at 600-1100° C. to obtain a result of potassium titanate containing potassium dititanate crystal; putting the sintering result into 1-50 times of alkaline solution with pH value equal to or greater than 8 or K$^+$ solution with concentration higher than 1 mol/L for reaction for over 4 hours at 20-100° C., and then carrying out hydration treatment in an acid solution with pH value smaller than 5; and dehydrating the obtained result through heat treatment; or taking alkali metal titanate as raw material, reacting in moisture atmosphere for 0.5-72 hours at temperature of 20-250° C. and humidity of 2-100%, washing with water or acid solution, and finally carrying out air sintering or solvent heat treatment. The most mean pore size of the obtained mesoporous titanium oxide is 3-15 nm, the pore volume is 0.05-04 cm$^3$/g, the specific surface area is 50-250 m$^2$/g, the crystal form of the titanium oxide is at least one of anatase phase titanium oxide, TiO$_2$(B) phase titanium oxide and rutile phase titanium oxide, the morphology of the mesoporous titanium oxide presents crystal whiskers, fiber or particles with the diameter of 0.1-10 μm or equivalent diameter.

Compared with the prior art, the invention has the following advantages:
(1) Because inorganic matter is combined on the pore wall and the outer surface, the mesoporous composite titanium oxide material of the invention improves the performance of the original mesoporous titanium oxide. It enables the rate of conversion in the hydrodesulfurization reaction to reach as high as 98 percent when acting as a catalyst carrier. It improves the insertion capacity of lithium ions to enable the specific capacity of the lithium ion battery to reach as high as 220 mAh/g when acting as a cathode material.
(2) The preparation method of the mesoporous composite titanium oxide material of the invention has simple process, low cost and suitability of bulk industrial production.

DETAILED DESCRIPTION OF THE INVENTION

The novel mesoporous composite titanium oxide prepared according to the invention has favorable performance on hydrodesulfurization if acting as a catalyst carrier for MoNi metal, and the invention is described by combining embodiments 1-7:

Embodiment 1

According to the method disclosed in the patent (ZL0315827.5), anatase type TiO$_2$, industrial grade K$_2$CO$_3$ (purity is 98 wt %) and H$_2$O are mixed evenly, in which TiO$_2$/K$_2$O=2.5 (molar ratio), and the water content is 20 wt %; the mixed reaction material is evenly applied on an alumina oxide bearing plate, the reaction temperature is 1000° C., the reaction time is 2 hours, and the sintered result is mixed crystal of potassium dititanate and potassium tetratitanate; after being dispersed in water, the sintered result is put into five times of water solution with pH value of 8 for reaction for 8 hours at 50° C., then is filtered, and is put into aqueous hydrochloric acid solution with pH value of 3 for stirring for 8 hours till solid potassium content is smaller than 5 wt % of the weight of the result; the result goes through washing and filtration, and is dried for 12 hours at 20-50° C. to obtain a hydrated product; the product is crystallized in air for 2 hours at 500° C. to obtain mesoporous TiO$_2$ in the crystal form of mixed crystal of anatase and monoclinic type TiO$_2$, the morphology presents crystal whisker, the specific surface area is 105 m$^2$/g, the mean pore size is 6.2 nm, and the pore volume is 0.23 cm$^3$/g.

1-naphthol acting as a precursor is dissolved in ethanol to form a solution, the concentration of the precursor is 1 mol/L, and the molar ratio of the precursor to the mesoporous titanium oxide is 0.05: the prepared mesoporous titanium oxide is added into the solution and stirred for 24 hours, then washed by water, and sintered in N$_2$ to obtain the mesoporous composite titanium oxide of the invention, the heating rate is 5° C./min, and temperature is held for 12 hours at 500° C. The mean pore size of the material of the invention is 9.6 nm, the specific surface area is 250 m²/g, and the crystal form of the titanium oxide is mixed crystal of anatase titanium oxide and TiO₂ (B).

A method for supporting metal MoNi comprises the following steps of: taking ammonium molybdate tetrahydrate and ammonium molybdate hexahydrate as an activity component precursor, dipping mesoporous titanium oxide of the same volume, standing for 4 hours, drying at 120° C., and carrying out sintering in a muffle furnace for 2 hours at 500° C. to obtain a catalyst.

Catalyst performance evaluation adopts a hydrodesulfurization experiment and is carried out on a self-made lab middle-pressure fixed-bed micro reactor. The loading amount of catalyst is 1 mL, the catalyst is loaded in the middle section of a tubular reactor, quartz sand is loaded in both ends of the tubular reactor, and reaction material is dimethyldibenzothiophene (DBT) with S content of 1737 ppm-decalin model solution. Before reaction, the catalyst is pre-sulfurized by 3 wt % $CS_2$-decalin for 8 hours in the conditions of reaction temperature of 300° C., reaction pressure of 2.0 MPa, volume space velocity of 2 $h^{-1}$ and hydrogen-oil ration (v/v) of 1200. The reaction solution is switched after presulfurization, reaction is carried out in the same condition, result is collected every one hour during activity evaluation during activity evaluation, and a stable value of conversion rate is taken as the conversion rate of DBT in the experimental condition. The experiment shows that the conversion rate of DBT can reach to over 95% after 8 hours.

Embodiments 2-7 are Shown in Table 1

Comparison Example 1

According to the method disclosed in the patent (ZL0315827.5), anatase type $TiO_2$, industrial grade $K_2CO_3$ (purity is 98 wt %) and $H_2O$ are mixed evenly, in which $TiO_2/K_2O=2.5$ (molar ratio), and the water content is 20 wt %; the mixed reaction material is evenly applied on an alumina oxide bearing plate, the reaction temperature is 1000° C., the reaction time is 2 hours, and the sintered result is mixed crystal of potassium dititanate and potassium tetratitanate; after being dispersed in water, the sintered result is put into five times of water solution with pH value of 8 for reaction for 8 hours at 50° C., then is filtered, and is put into aqueous hydrochloric acid solution with pH value of 3 for stirring for 8 hours till solid potassium content is smaller than 5 wt % of the weight of the result; the result goes through washing and filtration, and is dried for 12 hours at 20-50° C. to obtain a hydrated product; the product is crystallized in air for 2 hours at 500° C. to obtain mesoporous $TiO_2$ in crystal form of mixed crystal of anatase and monoclinic type $TiO_2$, the morphology presents crystal whisker, the mean pore size is 6.2 nm, the specific surface area is 105 m²/g, and the pore volume is 0.23 cm³/g. The obtained mesoporous $TiO_2$ in the crystal form of mixed crystal of anatase and monoclinic type $TiO_2$, the morphology presents crystal whisker, the mesoporous titanium oxide is taken as a carrier, and a method for supporting activity component MoNi is the same with embodiment 1. According to the catalyst performance evaluation method of embodiment 1, an experiment shows that the conversion rate of DBT is about 65% after 8 hours.

Comparison Embodiment 2

Hydrated titanium oxide (Jiangsu Zhenjing titanium pigment Co., Ltd) is taken as raw material, sintered for 2 hours at 500° C. to obtain imporous titanium oxide, the specific surface area is 280 m²/g, and the crystal form is anatase titanium oxide. The novel mesoporous composite titanium oxide is taken as a carrier, and a method for supporting activity component MoNi is the same with embodiment 1. According to the catalyst performance evaluation method of embodiment 1, an experiment shows that the conversion rate of DBT is about 60% after 8 hours.

The mesoporous composite titanium oxide prepared according to the invention has excellent performance when acting as a Li battery cathode material, and the invention is described by combining embodiment 8-13.

Embodiment 8

The preparation method of the mesoporous composite titanium oxide is the same as embodiment 1

The preparation process of a lithium ion battery cathode comprises the following steps of: adding the mesoporous composite titanium oxide of the invention, high conductivity carbon (Super P) and adhesive (polyvinylidene fluoride PVdF) according to the ratio of 85:10:5 into proper N-methylpyrrolidone and are mixed evenly, and then evenly applied on a copper foil roughened by a sand paper to obtain a pole piece, and the pole piece is dried in vacuum for 12 hours at 100° C. The manufacture of a simulated battery is carried out in a glove box; a metal lithium piece (99.9%) acts as counter electrode, a microporous polypropylene membrane (Celgard2330) acts as a diaphragm, and 1 mol/L LiFP6 of EC+DMC (the volume ration is 1:1, EC: Ethylene Carbonate; DMC: Dimethyl Carbonate) is electrolyte. The testing process of the battery is as follows: the assembled simulated battery is test on charge and discharge at 25° C., the voltage range is 1-3V, and the current density of the battery test is 120 mA/g. The battery performance test characterizes the charge-discharge performance through a NEWARE BTS-5 V 50 mA battery test workstation, thereby obtaining the specific capacity performance of the electrode material. The specific capacity is counted according to performance data after 5 times of charge-discharge cycles of the battery.

The preparation method of the mesoporous composite titanium oxide of embodiments 9-13 are the same with embodiments 2-7, and the preparation of an electrode and performance characterization process are the same with embodiment 8. The result of performances is shown in table 1.

Comparison Example 3

In terms of the mesoporous titanium oxide reported by literature [6], the mean pore size is 5 nm, the specific surface area is 99.3 m²/g, and the crystal form is anatase titanium oxide. Taking the mesoporous titanium oxide as activity component, the preparation method of an electrode is the same with embodiment 8. According to the battery test method of embodiment 8, the electrode material reported by the literature has the specific capacity of 175 mAh/g when acting as a lithium ion battery cathode.

Comparison Example 4

Commercial titanium oxide nano particles (Hangzhou Wanjing new material Co., Ltd) have specific surface area of 88.3 m²/g, pore volume of 0.05 cm³/g, and particle size of 10 nm. Taking the titanium oxide particles as activity component, the preparation method of an electrode is the same with embodiment 8. According to the battery test method of embodiment 8, the electrode material has specific capacity of 185 mAh/g when acting as a lithium ion battery cathode.

TABLE 1

Embodiment 2-7 Material preparing condition, structure and performance of product

| Embodiment 2-7 | Precursor | Solvet | Concentration of precursor (mol/L) | Molar ratio of precursor to mesoporous titanium oxide | Stirring time (h) | Washing and filtering agent | Sintering atmosphere | Sintering temperature (° C.) | Sintering time (h) |
|---|---|---|---|---|---|---|---|---|---|
| Embodiment 2 | Glucose | Water | 0.1 | 1 | 12 | Water | Ar | 500 | 5 |
| Embodiment 3 | Furfurl alcohol | Mesitylene | 10 | 0.005 | 1 | Ethanol | $N_2:CO_2$ (95%:5%) | 900 | 3 |
| Embodiment 4 | Thiopohenol | Ethanol | 1 | 0.001 | 72 | Acetone | CO | 500 | 20 |
| Embodiment 5 | Octadecyltrichlorosilance | Toluene | 0.005 | 0.03 | 4 | Acetone | $N_2$ | 300 | 12 |
| Embodiment 6 | Phenylphosphonic acid | Dichloromethane | 0.15 | 0.2 | 24 | Ethanol | $N_2:O_2$ (90%:10%) | 300 | 15 |
| Embodiment 7 | Sodium selenite | Water | 0.001 | 0.5 | 10 | Ethanol | He | 500 | 3 |

| Embodiment 2-7 | The Mean pore size (nm) | Specific surface area ($m^2/g$) | Pore volume ($cm^3/g$) | crystal form of titanium oxide | conversion rate of hydrode sulfurization (%) | Specific capacity (mAh/g) |
|---|---|---|---|---|---|---|
| Embodiment 2 | 10 | 150 | 0.35 | A&B | 98 | 195 |
| Embodiment 3 | 3 | 55 | 0.05 | A&R | 85 | 209 |
| Embodiment 4 | 5 | 70 | 0.3 | A | 75 | 218 |
| Embodiment 5 | 6 | 90 | 0.23 | A&B | 85 | 220 |
| Embodiment 6 | 7 | 85 | 0.25 | A&B | 90 | 205 |
| Embodiment 7 | 15 | 60 | 0.4 | A | 95 | 212 |

Note:
1. The raw material of mesoporous titanium oxide prepared in embodiments 2-7 are the same with embodiment 1;
2. In the column of sintering atmosphere, figures between two brackets represent volume ratios;
3. In the column of crystal form of titanium oxide, A represents anatase type titanium oxide, B represents $TiO_2(B)$ type titanium oxide, and R represents rutile type titanium oxide;
4. In the column of conversion rate of hydrodesulfurization, the method for supporting metal MoNi and the catalyst performance evaluation method are the same with embodiment 1; and
5. In the column of specific capacity, the preparation of an electrode and the performance characterization process are the same with embodiment 8.

REFERENCES

[1] Dzwigaj S., Louis C., Breysse M., Cattenot M., Bellière V., Geantet C., Vrinat M., Blanchard P., Payen E., Inoue S., Kudo H., Yoshimur Y. New generation of titanium dioxide support for hydrodesulfurization, Applied Catalysis B: Environmental, 2003: 41 181
[2] Yang Zhenguo, Choi Daiwon, Kerisit Sebastien, Rosso Kevin M., Wang Donghai, Zhang Jason, Graff Gordon, Liu Jun, Nanostructures and lithium electrochemical reactivity of lithium titanites and titanium oxides: A review, Journal of Power Sources, 2009: 192 588
[3] He Ming, Lu Xiaohua, Feng Xin, Yu Lei and Yang Zhuhong. A simple approach to mesoporous fibrous titania from potassium dititanate. Chemical Communication, 2004: 2 202; Lu Xiahua, He Ming, Yang Zhuhong, Feng Xin, Zheng Zhong, Bao Ningzhong, A synthetic method of titanium oxide with high specific surface area, ZL03158274.5, 2005.
[4] Lu Xiaohua, Zhou Yaxin, Liu Chang, Feng Xin, Yang Zhuhong, Wang Changsong, A method for fast-preparing of easy-controllable micropore-mesopore structure titanium oxide or the precursor thereof, PCT/CN2007/070428, 2007.
[5] Vioux Andre; Le Bideau Jean, Mutin P Hubert, Leclercq Dominique, Hybrid Organic-Inorganic Materials Based on Organophosphorus Derivatives, Topics in current chemistry 2004: 232 145
[6] Bao Shujuan, Bao Qiaoliang, Li, Changming, Dong Zhili. Novel porous anatase $TiO_2$ nanorods and their high lithium electroactivity. Electrochemistry Communications 2007: 9 1233

What is claimed is:
1. A mesoporous composite titanium oxide material for a catalyst carrier or a lithium ion battery cathode comprising:
a mesoporous titanium oxide, which has a specific surface area of 90-250 $m^2/g$ and a pore volume 0.05-0.4 $cm^3/g$;
wherein an outside surface of the mesoporous titanium oxide and wall surfaces of pores of the mesoporous titanium oxide are modified by a process to form a mesoporous titanium oxide having a composite layer on its outside surface and pores with composite layer on their wall surfaces;
the process is as follows:
dissolving a precursor containing at least one element of Si, C, S, P and Se in water or organic solvent to form solution,
adding mesoporous titanium oxide into the solution and stirring for 1-72 hours then filtering and washing with water or organic solvent, and
carrying out sintering in an atmosphere at 300-900° C.;
mass of the at least one element of Si, C, S, P and Se is in an amount of 0.01%-25% of a mass of said mesoporous composite titanium oxide material;

at least one mean pore size of pore distribution of the mesoporous composite titanium oxide material is 3-15 nm, a specific surface area is 90-250 m$^2$/g, and a pore volume is 0.05-0.4 cm$^3$/g;

morphology of the mesoporous composite titanium oxide material presents crystal whiskers, fiber or particles with the diameter of 0.1-10μm.

2. The mesoporous composite titanium oxide material according to claim 1, wherein the mesoporous titanium oxide in the mesoporous composite titanium oxide material is one or more selected from anatase phase titanium oxide, TiO$_2$(B) phase titanium oxide and rutile phase titanium oxide.

3. The mesoporous composite titanium oxide material according to claim 1, wherein a mean pore size of the added mesoporous titanium oxide is 3-15 nm, a pore volume is 0.05-04 cm$^3$/g, a specific surface area is 90-250 m$^2$/g, and crystal form of the mesoporous titanium oxide is at least one of anatase phase titanium oxide, TiO$_2$ (B) phase titanium oxide and rutile phase titanium oxide.

4. The mesoporous composite titanium oxide material according to claim 1, wherein the precursor is acid, alkali, soluble inorganic salt or organic matter containing at least one element selected from C, Si, S, P and Se.

5. The mesoporous composite titanium oxide material according to claim 4, wherein the precursor is $C_4$-$C_{20}$ carbohydrate, $C_4$-$C_{20}$ alcohol, $C_4$-$C_{20}$ mercaptan, $C_4$-$C_{20}$ silane, and $C_4$-$C_{20}$ organic phosphonic acid or selenate.

6. The mesoporous composite titanium oxide material according to claim 1, wherein the atmosphere used in the sintering process is one gas or at least two gases with different proportions selected from $N_2$, $O_2$, Ar, $H_2O$, He, $H_2$, CO and $CO_2$.

7. The mesoporous composite titanium oxide material according to claim 1, wherein a concentration of the precursor in water or organic solvent is 0.001-10 mol/L, and a molar ratio of the precursor to the mesoporous titanium oxide is 0.001-1.

8. The mesoporous composite titanium oxide material according to claim 1, wherein the organic solvent used for washing is non-polar or weak-polar solvent or strong-polar solvent.

9. The mesoporous composite titanium oxide material according to claim 1, wherein the organic solvent used for dissolution is non-polar or weak-polar solvent or strong-polar solvent.

\* \* \* \* \*